Aug. 7, 1945.  B. HAYTER  2,381,744

POT TYPE BURNER AND IMPROVED AIR ADMISSION MEANS THEREFOR

Filed March 14, 1942  2 Sheets-Sheet 1

Inventor
Bruce Hayter
by Parker & Carter
Attorneys.

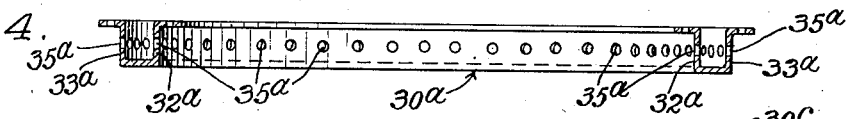
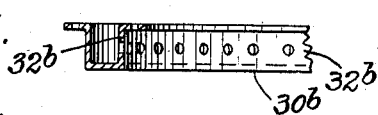
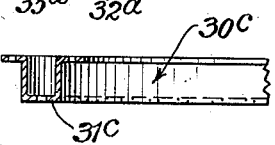
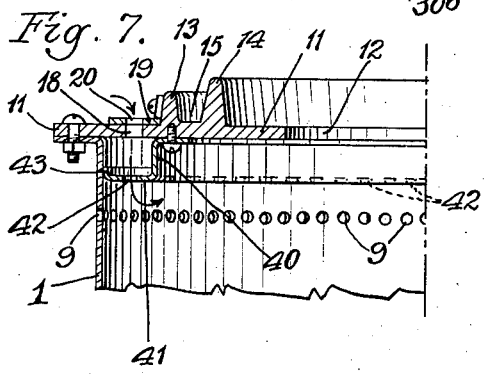
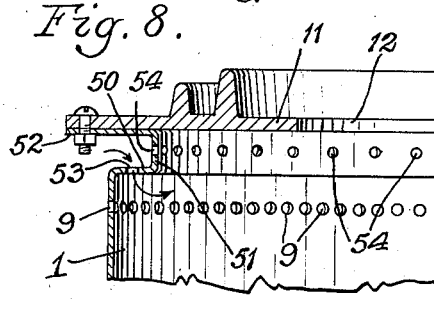
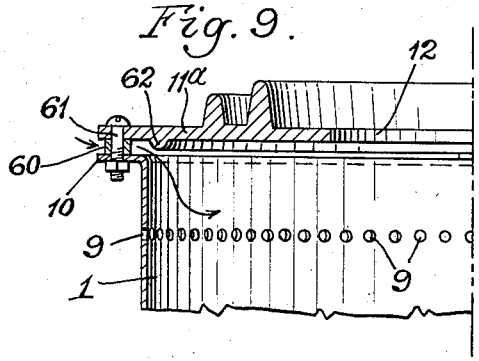

Patented Aug. 7, 1945

2,381,744

UNITED STATES PATENT OFFICE 2,381,744

POT TYPE BURNER AND IMPROVED AIR ADMISSION MEANS THEREFOR

Bruce Hayter, Sante Fe, N. Mex., assignor to Oil Devices, Santa Fe, N. Mex., a limited partnership of Illinois Application March 14, 1942, Serial No. 434,663

8 Claims. (Cl. 158—91)

My invention relates to an improvement in pot type oil burners and has for one purpose to provide improved means for supplying air to such a burner.

Another purpose is to provide improved means for supplying tertiary air.

Another purpose is to provide improved means for varying the supply of tertiary air to a pot type burner.

Other purposes will appear from time to time in the course of the specification.

I illustrate my invention more or less diagrammatically in the accompanying drawings wherein:

Fig. 4 is a transverse section through a tertiary air distributing ring varying somewhat from the corresponding ring shown in Fig. 2;

Fig. 5 is a similar view through a still further variation;

Fig. 6 is a similar view through a still further variation;

Fig. 7 is a partial radial vertical section through a variant form of the device;

Fig. 8 is a similar section through a still further variation of the device; and Fig. 9 is a similar section through a still further variation of the device.

Like parts are indicated by like symbols throughout the specification and drawings.

Figure 1:
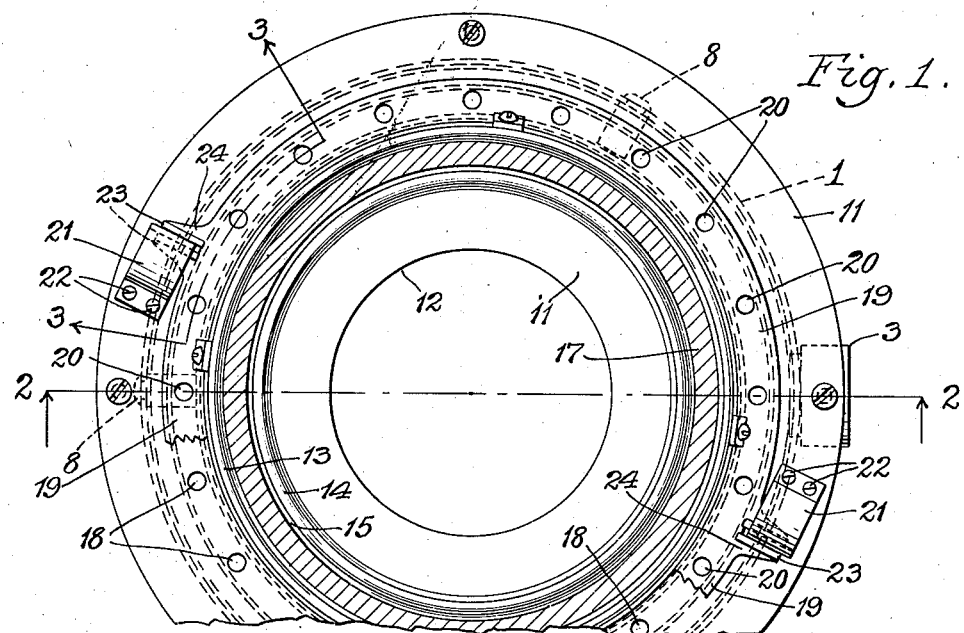
Fig. 1 is a section on the line 1—1 of Fig. 2.

Referring to the drawings, 1 generally indicates a burner pot for a pot type burner, the pot being illustrated as generally cylindrical and as having a bottom 2 and a fitting 3 screw threaded, as at 4, to receive any suitable liquid fuel nozzle or inlet pipe. It will be understood that any suitable means may be employed for delivering to such pipe a predetermined supply of liquid fuel, which may be varied to control combustion conditions within the pot.

My pot is particularly adapted for use with heaters in which it is desired to maintain a low pilot fire when maximum or intermediate heat is not desired.

5 indicates a row of primary air inlet apertures above which is located any suitable pilot baffle 6, centrally apertured as at 7, and mounted upon any suitable supports 8. 9 indicates a row of secondary air inlets in an upper portion of the wall of the pot 1. These inlets are shown as tipped, which is desirable but not essential.

10 is an outwardly extending flange at the top of the pot adapted to receive any suitable flame ring 11, centrally apertured as at 12. In the present instance the flame ring is provided with a plurality of upwardly extending annular concentric radially spaced flanges 13, 14, which define between them a channel 15, in which any suitable packing 16 may be positioned, and which is adapted to receive the bottom of any suitable sleeve 17. The flame ring is apertured as at 18, with a plurality of apertures located radially outwardly of the flange 13. These apertures are in register with corresponding apertures 20 in a ring 19. The position of this ring may be thermostatically controlled, as by the curved bimetallic leaf 21, which is secured at one end, as at 22, to the flame ring 11, and extends at the other end between two upstanding ears 23, formed on an outward extension 24 of the ring 19. It will be understood that the bimetallic control strip 21 provides means for putting the apertures 18 and 20 into and out of register in response to temperature conditions in the burner. The apertures 18 are shown as in communication with the interior of a distributor ring 30, having a bottom wall 31, an inner wall 32, and an outer wall 33, the walls 32 and 33 being provided with laterally extending flanges 34, which may be riveted, welded or otherwise secured to the lower face of the flame ring 11.

It will be understood that, if desired, the thermostatic control 21 may be omitted, and any suitable means may be employed for manually moving the ring 19. Or the ring 19 may be left permanently in any desired adjustment, with the apertures 18 and 20 either fully in register, partly in register, or out of register, depending upon the needs of the particular heater.

Figure 2:
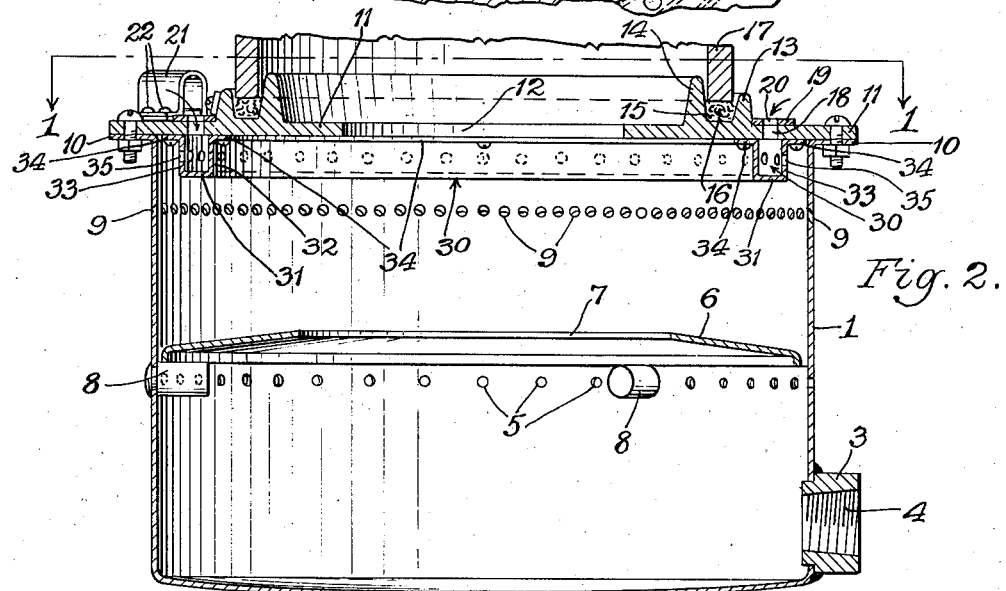
Fig. 2 is a section on the line 2—2 of Fig. 1.

It will be noted that in the form of Fig. 2 the distributor ring 30 is provided with a plurality of air apertures 35 in the outer wall 33. In Fig. 4 a corresponding ring 30a is shown, with apertures 35a in the outer wall 33a, and also in the inner wall 32a. In Fig. 5 the corresponding ring 30b is illustrated with apertures only in the inner wall 32b. In Fig. 6 the corresponding distributor ring 30c is illustrated with apertures only in the bottom wall 31c. It will be understood that such apertures may be employed in any or all of the three exposed walls of these distributor rings.

In Fig. 7 I illustrate a form of the device in which a distributor ring 40 is employed, which has a bottom 41, having air inlet apertures 42. The bottom 41 is provided with an upwardly extending flange 43, at its outer edge, which abuts against the inner face of the wall of the pot 1.

In the form of Fig. 8 the pot itself is modified in shape and is provided with an inwardly reduced portion having a bottom inwardly extending wall 50, a generally vertical upwardly extending wall 51, and an outwardly extending top flange 52. The walls 50 and 51 are provided, respectively, with apertures 53 and 54. It will be understood that either or both may be employed.

In the form of Fig. 9 the flame ring 11a is shown as devoid of the apertures 18, but is spaced upwardly above the flange 10 of the pot 1 by means of any suitable spacing sleeves 60, threaded on any suitable screws or securing means 61. In this form preferably a bead or deflecting flange 62 is employed to cause the tertiary air initially to flow downwardly as well as inwardly into the interior of the pot.

It will be realized that, whereas I have described and illustrated a practical and operative device, nevertheless many changes may be made in the size, shape, number and disposition of parts without departing from the spirit of my invention. I therefore wish the description and drawings to be taken as in a large sense illustrative or diagrammatic, rather than as a limitation to the precise showing.

The use and operation of my invention are as follows:

With reference to the various forms or embodiments of my invention herein shown, I illustrate a burner pot in which the side wall of the pot is provided with primary and secondary air inlet apertures located at various levels. It will be understood that, whereas I have shown a single row of primaries and a single row of secondaries, I do not wish to limit myself to this particular arrangement of apertures, although I find it a convenient one.

It will be understood that the burner pot is mounted in any suitable outer housing, not herein shown, and means are provided for admitting air to the space outside of the pot 1. The air flows inwardly through the apertures 5 and 9 to provide, respectively, a primary and a secondary air supply for mixture with the vaporized liquid fuel burned in the pot. The fuel is vaporized upon admission to the bottom of the pot 2 by the heat of combustion taking place above. When a minimum supply of fuel is delivered, the level at which combustion takes place is substantially that of the pilot ring 6. The apertures 5 provide the primary air, and the mixture passes upwardly through the central aperture 7 of the pilot ring 6 and receives its secondary air supply through the apertures 9. When the rate of fuel flow is increased, the combustion level rises, and at the full fire it may be at or above the level of the secondary air inlets 9.

I find it desirable to provide for complete combustion an additional or tertiary air supply, admitted at a level above the secondary apertures. The air may be admitted through the distributor ring 30, 30a, 30b or 30c, the interior of such ring being in communication with the outside air through the apertures 28 and the apertures 18 of the flame ring 11. The air may be delivered either inwardly or outwardly through the inner or outer wall of the distributor ring, or even downwardly, as shown in Fig. 6, or may be delivered through any combination. The outwardly directed tertiary jets tend to stabilize the secondary jets and to cut down noise and to limit carbon deposits and keep the jets from leaving the secondary apertures 9. The inwardly directed tertiary air simply adds additional oxygen to the completed mixture. The primary purpose of the admission of tertiary air is to clean the flame—in other words, to consume all of the carbon. It is important to get the tertiary air to the mixture at a point where the flame is sufficiently hot to result in a complete burning up or union of the carbon with the oxygen.

Figure 3:
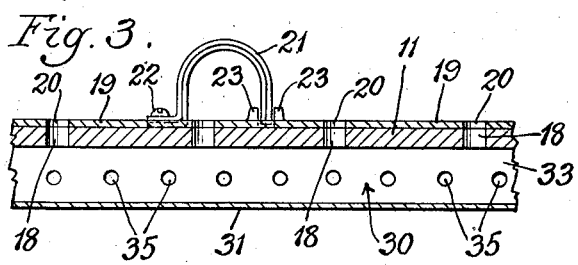
Fig. 3 is a section on the line 3—3 of Fig. 1.

It will be understood that this tertiary air supply may be employed without the employment of the thermostatic control shown in Figs. 1 to 3. However, under some circumstances it is advantageous to provide the shutter 19, with its apertures 20, and to move this shutter by some heat responsive means, such as the bimetallic strip 21. For example, at the choice of the operator, this shutter can be employed to open or put in register the apertures 18, 20, and admit tertiary air when a predetermined temperature is exceeded. Or the process can be reversed, and the tertiary air can be cut off after the starting stage, where the user desired to deliver a maximum supply of air only at the starting stage.

While the separate tertiary air distributing ring shown in Figs. 1 to 7 is advantageous, substantially the same result may be obtained by the structure of Fig. 8, where the reduced top portion of the pot is employed. In the form of Fig. 9 a similar result is obtained by spacing the flame ring above the pot. In the forms of Figs. 8 and 9 it will be understood, of course, that no variation of the cross sectional area of the aperture or apertures for admitting tertiary air is provided. The form of Fig. 7 permits air to be delivered either downwardly or inwardly, or both, and since the distributor ring is located adjacent the outer face of the pot, it is not necessary to deliver air outwardly. The apertures in the bottom of the ring are sufficiently close to the secondary air inlets 9 to get the desired effect.

I claim:

1. In a pot type burner, a burner pot, means for supplying air to the interior thereof, a centrally apertured flame ring partially closing the top of the pot, said flame ring having additional apertures intermediate its edges adapted to admit air downwardly into the interior of the pot, and means for thermostatically controlling the cross sectional area of such additional apertures.

2. In a pot type burner, a burner pot, means for supplying air to the interior thereof, a centrally apertured flame ring partially closing the top of the pot, said flame ring having additional apertures intermediate its edges adapted to admit air downwardly into the interior of the pot, and a hollow distributor member located beneath said flame ring, its interior being in communication with the additional apertures of the flame ring, said distributor member being provided with a plurality of air apertures in communication with the interior of the pot.

3. In a pot type burner, a burner pot having a circumferential substantially cylindrical side wall, said side wall having a plurality of primary air inlet apertures in an intermediate portion thereof and having a plurality of secondary air inlet apertures positioned above the highest of said primary air inlet apertures, and additional means for supplying tertiary air to the interior of the pot at a level above the admission of secondary air to the pot, said means including a centrally apertured flame ring partially closing the top of the pot, said flame ring having additional apertures intermediate its outer and inner edges and aligned with the interior of the pot, and a generally annular distributor below said flame ring, the interior of which distributor is in communication with said additional apertures through the flame ring, said distributor having apertures adapted to direct tertiary air into the interior of the pot.

4. In a pot type burner, a burner pot having a circumferential substantially cylindrical side wall, said side wall having a plurality of primary air inlet apertures in an intermediate portion thereof and having a plurality of secondary air inlet apertures positioned above the highest of said primary air inlet apertures, and additional means for supplying tertiary air to the interior of the pot at a level above the admission of secondary air to the pot, said means including a centrally apertured flame ring partially closing the top of the pot, said flame ring having additional apertures intermediate its outer and inner edges and aligned with the interior of the pot, and a generally annular distributor below said flame ring, the interior of which distributor is in communication with said additional apertures through the flame ring, said distributor having apertures adapted to direct tertiary air into the interior of the pot, and shutter means on the flame ring, and adapted to vary the cross sectional area of said additional apertures through the flame ring.

5. In a pot type burner, a burner pot having a circumferential substantially cylindrical side wall, said side wall having a plurality of primary air inlet apertures in an intermediate portion thereof and having a plurality of secondary air inlet apertures positioned above the highest of said primary air inlet apertures, and additional means for supplying tertiary air to the interior of the pot at a level above the admission of secondary air to the pot, said means including a centrally apertured flame ring partially closing the top of the pot, said flame ring having additional apertures intermediate its outer and inner edges and aligned with the interior of the pot, and a generally annular distributor below said flame ring, the interior of which distributor is in communication with said additional apertures through the flame ring, said distributor having apertures adapted to direct tertiary air into the interior of the pot, and shutter means on the flame ring and adapted to vary the cross sectional area of said additional apertures through the flame ring, and heat responsive means for automatically actuating said shutter means in response to variations in temperature adjacent the pot.

6. In a pot type burner, a burner pot having an open end and a circumferential side wall, said wall having a plurality of primary air inlets circumferentially spaced thereabout, and having secondary air inlet apertures located adjacent the open end of the pot, a flame ring partially closing the open end of the pot, and means for delivering tertiary air to the interior of the pot at a level intermediate said secondary air inlet apertures and the flame ring including an apertured distributor ring positioned between the flame ring and said secondary air inlet apertures, the interior of said distributor ring being in communication with air exterior to the pot.

7. In a pot type burner, a burner pot having a circumferential wall, a closed end and an open end, said wall having a plurality of primary air inlet apertures, and a plurality of secondary air inlet apertures, said secondary air inlet apertures being located adjacent the open end of the pot, said primary air inlet apertures being substantially more remote from the open end of the pot than are the secondary air inlet apertures, means for directing tertiary air into the pot, adjacent the zone of admission of secondary air to the pot, but closer to the open end of the pot, including an apertured distributor ring, within the pot, located between the secondary air inlet apertures and the open end of the pot, the interior of the distributor ring being in communication with the outside air, and being in communication, through its apertures, with the interior of the pot.

8. In a pot type burner, a burner pot having a circumferential wall, a closed end and an open end, said wall having a plurality of primary air inlet apertures, and a plurality of secondary air inlet apertures, said secondary air inlet apertures being located adjacent the open end of the pot, said primary air inlet apertures being substantially more remote from the open end of the pot than are the secondary air inlet apertures, means for directing tertiary air into the pot, adjacent the zone of admission of secondary air to the pot, but closer to the open end of the pot, including an apertured distributor ring, within the pot, the interior of the distributor ring being in communication with the outside air, and being in communication, through its apertures, with the interior of the pot, and a centrally apertured flame ring partially closing the open end of the pot, the distributor ring being mounted on the flame ring, the flame ring having air inlet apertures through which outside air may pass to the interior of the distributor ring.

BRUCE HAYTER.